United States Patent [19]
Santos

[11] Patent Number: 5,974,780
[45] Date of Patent: Nov. 2, 1999

[54] METHOD FOR REDUCING THE PRODUCTION OF NOX IN A GAS TURBINE

[76] Inventor: Rolando R. Santos, 15012 SW. 146th St., Miami, Fla. 33196

[21] Appl. No.: 08/854,999

[22] Filed: May 13, 1997

Related U.S. Application Data

[63] Continuation of application No. 08/329,193, Oct. 26, 1994, Pat. No. 5,628,184, which is a continuation-in-part of application No. 08/012,923, Feb. 3, 1993, abandoned.

[51] Int. Cl.⁶ .................................................. F02C 3/30

[52] U.S. Cl. ........................................ 60/39.05; 60/39.59

[58] Field of Search ..................... 60/39.05, 39.3, 60/39.55, 39.59

[56] References Cited

U.S. PATENT DOCUMENTS

| | | | |
|---|---|---|---|
| 2,438,998 | 4/1948 | Halford | 60/39.3 |
| 3,921,389 | 11/1975 | Kawaguchi | 60/39.05 |
| 4,110,973 | 9/1978 | Haeflich et al. | 60/39.05 |

*Primary Examiner*—Louis J. Casaregola
*Attorney, Agent, or Firm*—Brooks & Kushman P.C.

[57] ABSTRACT

An apparatus is disclosed for reducing the production of NOx in an engine. One embodiment of the apparatus comprises a plurality of mixing cans in which air is drawn into the flow of gaseous fuel therethrough. The gaseous mixture formed by one of the mixing cans is transmitted to the engine at a rate which increases with the load on the engine, and the other mixing cans are serially brought on line after the preceeding mixing cans reach their predetermined rate.

3 Claims, 5 Drawing Sheets fig-5 fig-6 fig-7 fig-8 fig-9

METHOD FOR REDUCING THE PRODUCTION OF NOX IN A GAS TURBINE

RELATED PATENT APPLICATION DATA

This is a continuation of application Ser. No. 08/329,193 filed on Oct. 26, 1994 (U.S. Pat. No. 5,628,184) which in turn was a continuation-in-part of Ser. No. 08/012,923 filed on Feb. 3, 1993 (abandoned).

TECHNICAL FIELD

This invention relates to the reduction of oxides of nitrogen (NOx) during combustion, and more particularly to an apparatus and method for reducing the production of NOx in an engine such as a gas turbine.

BACKGROUND ART

Fossil fuels are burned to produce energy for a variety of applications. In many conventional engines such as gas turbines, fuel is vaporized and mixed with air at or near their stoichiometric ratio prior to combustion. In order to increase the efficiency of combustion, it is known to premix a quantity of air with the fuel prior to introduction of the mixture into the combustion zone of the engine such as the combustor of a gas turbine.

An example of premixing is disclosed in U.S. Pat. No. 4,835,962 to Rutter. Rutter discloses a fuel atomization apparatus for a gas turbine engine in which during start-up, fuel is directed through a mixing apparatus. The pressure drop created as the fuel passes through a nozzle draws air into the apparatus and effects mixing of fuel and air. However, because the flow rates through the mixing nozzle of the apparatus are not sufficient for most post-start-up engine operating conditions, it is necessary to provide a means for delivering greater amounts of fuel to the combustor.

A frequent unwanted product of combustion is oxides of nitrogen, commonly known as NOx. It is generally accepted that NOx formation results from incomplete combustion and/or very high combustion temperatures. It has been suggested that the formation of nitrous oxide (NO), a prerequisite to the formation of NO2, can be controlled either by lowering the peak temperatures in the combustor by lean, premixed operation and by exhaust gas recirculation, or by reducing the residence time in the primary zone by rapid addition of secondary air through turbulent mixing. Anand and Gouldin, *Combustion Efficiency of a Premixed Continuous Flow Combustor*, Journal of Engineering for Gas Turbines and Power, July 1985, Vol. 107, pp. 695–705. In order to reduce the formation of NOx, various proposals have been made to reduce the temperature of combustion, including the introduction of water into the combustion zone, low excess air operation, staged combustion or off stoichiometric firing, and flame temperature reduction.

In a liquid fuel fired engine, the water to be introduced into the combustion zone may first be emulsified with the fuel either through the addition of a chemical surfactant, the use of a mixer or other mechanical means, or both. For example, U.S. Pat. No. 4,110,973 to Haeflich et al. discloses a gas turbine engine power plant having a water/fuel mixing device that employs a fuel conduit with a helical arrangement of water injection apertures for injecting water jets through the fuel to impinge upon the inside wall of the conduit and mix homogeneously with the fuel. As an alternative to emulsification, steam may be injected directly into the combustion zone. For example, U.S. Pat. No. 4,102,125 to Schelp discloses a gas turbine engine in which water is turned to steam in the hot turbine, superheated, and then injected into the combustor to aid in the gasification of fuel and to reduce the flame temperature.

An example of staged combustion is disclosed by U.S. Pat. No. 4,629,413 to Michelson et al. Michelson teaches a premix burner having a burner tube provided with a jet eductor system at the upstream end section of the tube for inspirating and mixing primary air with fuel gas, a burner tip at the downstream end of the tube provided with ports for receiving and burning the mixture of primary air and fuel gas, and a burner tile surrounding the downstream end section of the tube. The channel between the tile and the tube section is sealed off to prevent access of secondary air thereto, and secondary air is supplied to flow downstreamwardly outside of the tile and to promote mixing of the secondary air with the flame downstream of the burner to achieve delayed combustion.

Similarly, U.S. Pat. No. 5,022,849 to Yoshii et al. discloses a low NOx burning method and apparatus wherein a low air ratio flame burned with an amount of air less than the theoretical air ratio required for burning fuel perfectly is formed, and combustibles discharged from the low air ratio flame are burned at a trailing stream of the low air ratio flame while supplying air.

However, systems for reducing the production of NOx during combustion, such as those described above, have so far been unable to meet proposed environmental regulations, or are prohibitively expensive to manufacture and operate.

SUMMARY OF THE INVENTION

One embodiment of the present invention is an apparatus for forming a mixture of water and fuel to be supplied to an engine. The apparatus comprises a pair of mixing cans. Each of the mixing cans includes a housing in communication with the air, and a pipe extending at least partially into the housing for conducting a flow of the fuel through the housing to create a region of relatively low pressure to facilitate the introduction of air into the housing to form a mixture of air and fuel. A conduit transmits the mixture formed by one of the mixing cans to the engine at a rate which increases with the load on the engine, and another conduit transmits the mixture formed by the is other of the mixing cans to the engine after the one mixing can reaches a predetermined rate. Additional mixing cans may be similarly brought on line in series.

Accordingly, it is an object of the present invention to provide an apparatus of the type described above for reducing the production of NOx during combustion.

Another object of the present invention is to provide an apparatus of the type described above for reducing the production of NOx in a gas turbine.

Another object of the present invention is to provide an apparatus of the type described above having multiple injectors for mixing water and fuel which are phased in to supply the engine as the load on the engine increases.

Another object of the present invention is to provide an apparatus of the type described above having multiple mixing cans for mixing air and fuel which are phased in to supply the engine as the load on the engine increases.

Still another object of the present invention is to provide an apparatus of the type described above in which all the air necessary for combustion is provided to a combustion can through a dual fuel manifold.

Still another object of the present invention is to provide a method of forming a mixture of air, water, and/or fuel to be supplied to an engine.

These, and other objects, features, and advantages of the present invention are readily apparent from the following detailed description of the best mode for carrying out the invention when taken in conjunction with the accompanying drawings.

BEST MODE FOR CARRYING OUT THE INVENTION

With reference to the drawings, the preferred embodiments of the present invention will be described. FIGS. 1 through 4 show an apparatus 10 according to the present invention for forming a mixture of water and fuel to be supplied to an engine such as an electricity producing gas turbine 12. The apparatus or mixing can 10 comprises a housing 14 and a plurality of injectors or nozzles 16, 18, 20, 22, 24 and 26.

Figure 1:
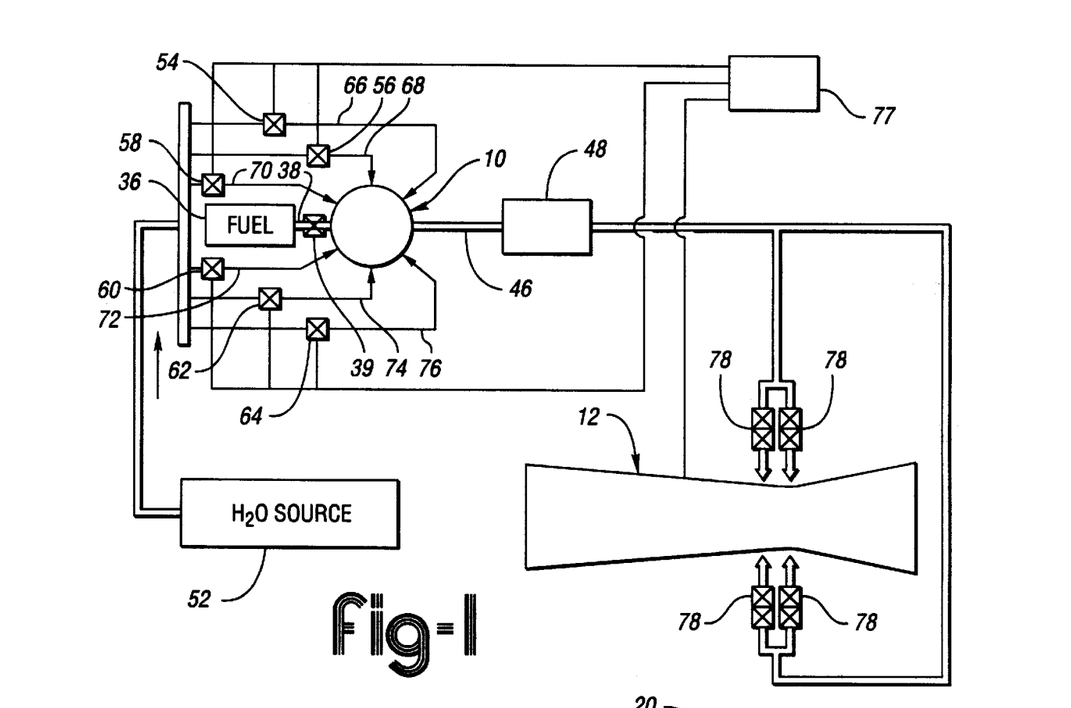
FIG. 1 is a schematic view of an apparatus for forming a mixture of water and fuel to be supplied to an engine.

The housing 14 is preferably in the form of a metal cylinder 28 having end caps 30 and 32 threadingly engaged therewith. The housing 14 has an inlet 34 through which the fuel, preferably a light distillate oil such as number 2 diesel, may pass from a source of the fuel 36 through a conduit 38, modulation valve 39, an inlet pipe 40, and finally enter the housing 14. An outlet 42 and an outlet pipe 44 are similarly arranged on the opposite side of the housing 14 and are in communication through a conduit 46 with the engine 12 via a distributor block 48, as described more fully below. A ¼ inch coupling 50 is optionally provided through the end cap 30 through which the pressure in the mixing can 10 may be measured.

Figure 2:
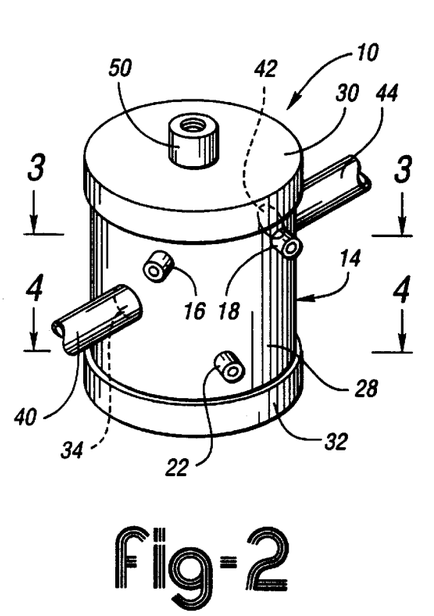
FIG. 2 is a perspective view of a mixing can for forming the mixture.
Figure 3:
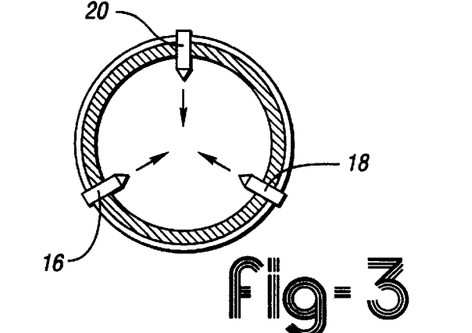
FIG. 3 is a cross-sectional view of the mixing can taken along line 3—3 of FIG. 2.
Figure 4:
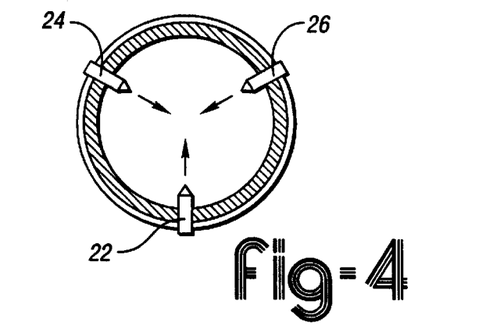
FIG. 4 is a cross-sectional view of the mixing can taken along line 4—4 of FIG. 2.

The injectors 16, 18, 20, 22, 24 and 26 may be arranged at any orientation to the flow of fuel incoming through the inlet 34, but are preferably arranged at regular intervals about the housing 14. As shown in FIGS. 2 through 4, for instance, an upper tier of injectors 16, 18 and 20 is arranged in a plane on one side of the axis defined by inlet 34 and outlet 42, while a lower tier of the injectors 22, 24, and 26 is arranged in a plane on the other half of the mixing can The injectors in each tier are spaced at 120 degree intervals around the circumference of the cylinder 28, and the tiers are offset from each other by 60 degrees so that there is an injector positioned at each 60 degree interval.

The injectors are in communication with a source of demineralized water 52 through modulation valves 54, 56, 58, 60, 62 and 64 and respective incoming ¼ inch pipe couplings 66, 68, 70, 72, 74 and 76. The modulation valves are manually or automatically operable by controller 77, as discussed below. The injectors are preferably ¼ MEG 6510 threaded wash jet nozzles, available from Spraying Systems Co. of Wheaton, Ill.

One of the injectors, for example a first injector 16, is adapted to spray water into the housing 14 at a rate which increases with the load on the engine up to a predetermined rate, which is preferably the maximum rate or throughput capacity of the injector. For instance, the throughput capacity of the ¼ MEG 6510 injector is approximately 6.5 gallons per minute. For the preferred system in which six injectors are used, the injectors are chosen such that the maximum rate of the first injector is reached when the energy demand of the engine 12, and thus the flow of fuel through the mixing can 10, reaches about one sixth of its maximum. The fuel flow rate in a typical gas turbine may range from about 17 gallons per minute at low loads to about 36 gallons per minute at peak loads.

One of the other injectors, for example a second injector 26, is adapted to spray water into the housing 14 only after the first injector 16 reaches its maximum rate. Like the first injector 16, the second injector 26 has a maximum flow rate that is eventually attained, which in the embodiment shown in FIGS. 1 through 4 corresponds to about one third of peak engine load. The additional high demand injectors 18, 20, 22, and 24 are similarly adapted to spray water into the housing 14, and are similarly phased in to operate after the injectors already in operation reach their predetermined, normally maximum, rate.

At their maximum flow rates, the injectors atomize the water to a droplet size of about 200 microns. The water and fuel thereafter form a mixture in the housing 14, with the water droplets providing a core around which the fuel forms. The homogeneous emulsification of the water and fuel then exits the housing 14 through the outlet 42 and outlet pipe 44.

A series of static mixers 78 in downstream communication with the distributor block 48 are adapted to accept the mixture from the outlet 42 of the housing 14 and impart turbulence to the mixture before the mixture is supplied to the engine 12. ½ inch KMS 6X static mixers, available from Chemineer Kenics of North Andover, Mass., are suitable for this use. The static mixers 78 reduce the droplet size of the water to about 11 microns, around which the fuel again forms. The fuel and water mixture is then transported to the point of combustion, for example the combustor of the gas turbine 12.

The present invention also includes a method of forming a mixture of water and fuel to be supplied to an engine. The method comprises introducing the fuel into a housing, and spraying water through a first injector into the housing at a rate which increases with the load on the engine, such that the water and fuel form a mixture. Then, water is sprayed through a second injector into the housing after the first injector reaches a maximum rate. Finally, the mixture is delivered to the engine. The method may further comprise passing the mixture through a static mixer before delivering the mixture to the engine.

When the mixture is exposed to combustion conditions, for instance the combustion flame in the combustion zone of a gas turbine, the water droplets flash to steam. The resulting explosion further reduces the size of the fuel droplets. Because the fuel droplets at this point are relatively small, complete combustion occurs in a correspondingly short time. Although the peak combustion temperature may be theoretically sufficient for NOx formation, even though the presence of water reduces the flame temperature to some degree, that temperature is sustained only for a short time. The shortened resident time more than compensates for the high temperature, and thus the overall level of NOx formation is reduced as compared with conventional systems that are not specially fitted with NOx reduction equipment. Because combustion is also more complete than in conventional combustion processes, carbon monoxide levels are kept comparable to conventional systems not fitted with special NOx reduction equipment.

Figures 5, 6:
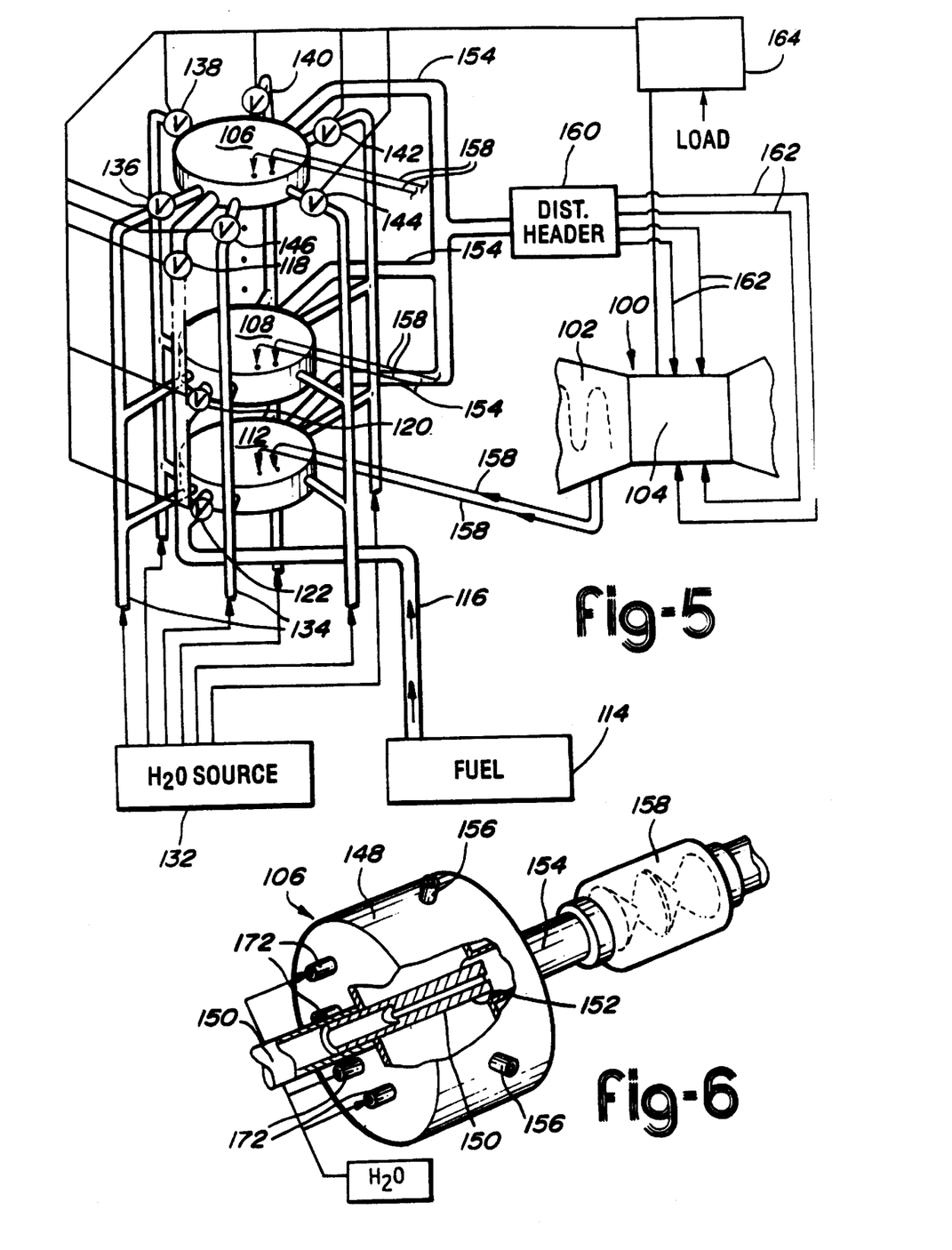
FIG. 5 is a schematic view of an apparatus for forming a mixture of air, water and fuel to be supplied to an engine, including an alternative embodiment of the mixing can.
FIG. 6 is a perspective view of the alternative embodiment of the mixing can shown partially cut away.

FIG. 5 shows a gas turbine engine 100 comprising a compressor 102, a combustor 104, and a plurality of mixing cans 106, 108 and 112 according to another embodiment of the present invention. The compressor 102 may be of any conventional type capable of compressing ambient air. The combustor 104 is in communication with the compressor 102, and operates to sustain combustion in well known manner.

Each mixing can is in communication with a source 114 of fuel, preferably a gaseous fuel such as natural gas, through conduit 116 and respective modulation valves 118, 120 and 122. Each mixing can is also in communication with a source 132 of demineralized water, as represented in FIG. 5 by mixing can 106, six conduits 134 and check valves 136, 138, 140, 142, 144 and 146.

FIG. 6 shows a representative one of the mixing cans 106. The mixing can 106 includes a housing 148 and a pipe or nozzle 150 which extends at least partially into the housing 148. Preferably, the pipe 150 extends all the way through the housing 148, through an outlet 152, and slightly into an outlet pipe 154 positioned on the opposite side of the housing 148. In the preferred embodiment shown in FIG. 6, the inside diameter of the outlet pipe 154 is greater than the outside diameter of the pipe 150 so that there is an annular gap therebetween.

The housing 148 is in communication with the air through a plurality of inlets 156 spaced regularly around the perimeter of the housing. While the air may be introduced into the interior of the housing 148 at ambient conditions, it is desirable that the air be as dense as possible. Therefore, the air is preferably compressed before being communicated to the housing, either by a dedicated compressor (not shown) or by the compressor section 102 of the gas turbine 100 Preferably, the compressed air is delivered to inlets 156 from the compressor 102 through conduits 158 shown in FIG. 5.

The natural gas is normally supplied through the pipe 150 at about 68–74 degrees Fahrenheit and about 250–270 pounds per square inch gauge (psig). Typical flow rates of the natural gas through the pipe 150 are about 4400 cubic feet per minute at base load, and about 5400 cubic feet per minute at peak load.

The flow of fuel through the pipe 150 creates a partial vacuum in the interior of the housing 148 to facilitate the introduction of the air into the housing and into the flow of fuel. The configuration of the pipe 150 in the housing 148 thus provides an eductor means, with the fuel as the motive fluid, for conducting a flow of the fuel into and preferably through the housing to create a region of relatively low pressure in the housing such that the air is drawn or sucked into the housing and into the flow of fuel. As an alternative to the pipe design shown in FIG. 5, a jet gas compressor such as a Type 426 or Type 439 Jet Compressor, available from Schutte and Koerting Division of Ketema of Bensalem, Pa., may be used.

Typical axial or centrifugal compressors on commercially available gas turbines produce air pressures at the inlets 156 in the range of about 90 to 170 psig. It is desirable that this pressure be relatively high, in order to facilitate the introduction of the incoming air into the suction chamber. The air is likewise introduced at the lowest feasible temperature and correspondingly at the highest feasible density, in order to increase the amount of air available to mix with the fuel flowing through the housing 148. Therefore, the compressor air may be passed through a heat exchanger before its introduction into the suction chamber.

Referring again to FIG. 5, the outlet pipe 154 of each mixing can is optionally fitted with a static mixer 159, such as a Chemineer Kenics 3 inch KMA 3, to provide additional mixing of the mixture. The outlet pipe 154 is thereafter in communication with a distribution header 160. The distribution header 160 is in turn in communication with the combustor section 104 of the gas turbine 100 through conduits 162, as is conventional. Typical pressures in the combustor 104 are about 160 psig. It should be appreciated that this particular configuration can be replaced by any suitable means for transmitting the mixture of air and fuel formed by the mixing cans to the engine.

Because a particular mixing can operates most efficiently at some fraction of the engine's total required fuel flow, multiple mixing cans are provided and serially phased in to supply the total required fuel to the distributor block 160. During start up and initial operation of the gas turbine 100, only one of the mixing cans is operated until the mixing can reaches a predetermined, normally maximum rate of output. For example, the valve 118 is opened, allowing the fuel to flow to one of the mixing cans 106, while the other valves 120 and 122 remain closed. As the load on the engine increases past the ability of one mixing can to supply fuel, the valve 120 is opened manually or automatically by a controller 164 in communication with the valves and with the gas turbine 100, so that a second mixing can 108 is brought on line to transmit the mixture of air and fuel formed therein to the engine The other mixing cans are similarly serially phased in through the operation of their fuel check valves, e.g. the valve 122 of mixing can 112. It is preferred that there be six mixing cans, each of which is capable of supplying one-sixth of the fuel flow required by the gas turbine 100 at peak load.

The premixture of air and fuel formed upstream of the combustion zone preferably contains a percentage of fuel close to but outside the flammability limits of the given fuel. For instance, natural gas is theoretically flammable in air when the natural gas constitutes between about 4.8 and 13.5 volume percent of the mixture. Preferably, the mixture supplied to the engine in the present invention is well above this range, on the order of about 400 cubic feet per minute of air to 1000 cubic feet per minute of natural gas when operating at about 60 to 75 degrees Fahrenheit.

The presence in the premixture formed by the mixing cans of a large percentage of the total air required for combustion allows that when the premixture is exposed to secondary air and the resulting lean mixture is combusted in the combustion zone, complete combustion occurs in a relatively short time. This quickened burn may occur at a higher than normal peak combustion temperature that is theoretically sufficient for NOx formation, however that temperature is cooled by the availability of excess air and therefore is sustained only for a short time. The lower resident time in the combustion zone more than compensates for the high temperature so that the overall level of NOx formation is reduced. Because combustion is also more complete than in a conventional gas turbine combustion process, carbon monoxide levels are kept comparable to conventional systems which do not employ special Nox reduction equipment.

Referring again to FIG. 6, the mixing can 106 is optionally provided with a plurality of injectors or nozzles 172 in communication with the water conduits 134. The injectors 172 are adapted to inject a spray of water into the housing 148. There are preferably six water injectors, the flow of water to which is controlled by respective check valves 136, 138, 140, 142, 144 and 146. The injectors 172 are preferably the same Spraying Systems Co. ¼ MEG 6510 wash jet nozzles discussed above with respect to the liquid mixing can. The injectors 172 provide a means for introducing water into the housing, but it should be appreciated that other suitable substitutes which perform the same function are acceptable.

The atomized water droplets delivered by the injectors 172 initially cool the primary air entering the housing 148 through the inlets 156, and then pass with the fuel and air mixture through the distribution block 160 to the gas turbine 102. The water droplets flash to saturated steam at about 250 degrees Fahrenheit when exposed to the high temperatures in the combustor 104, and the steam mixes homogeneously with the natural gas because of their similar densities. Because the water droplets flash to steam close to the point of combustion, there is insufficient time for the steam to phase back to water. The presence of the steam in the combustion zone further lowers the flame temperature, and thereby further reduces the level of NOx produced by the combustion reaction.

Figure 7:
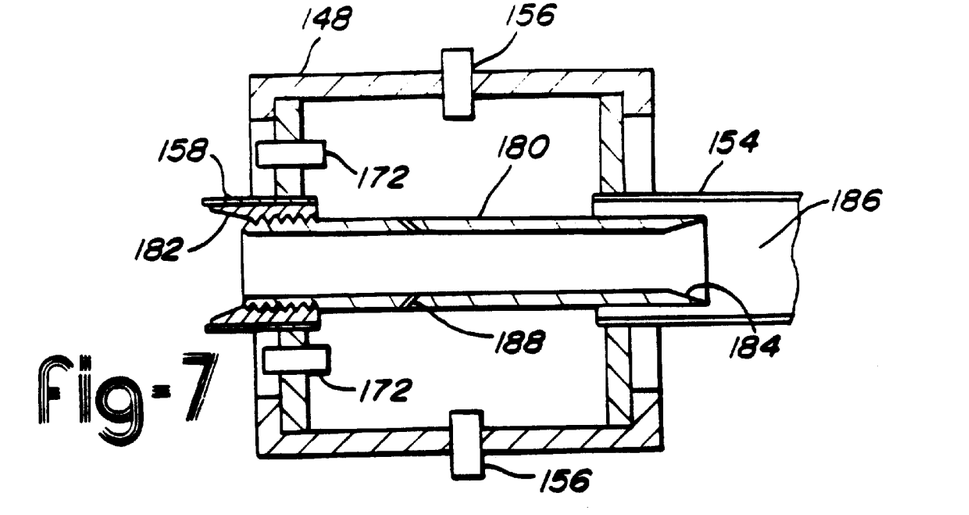
FIG. 7 is a cross-sectional view of the mixing can shown in FIGS. 5 and 6 having an alternative embodiment of a pipe extending therethrough.

FIG. 7 shows an alternative embodiment 180 of the pipe which extends at least partially through the housing 148. The inlet side of the pipe 180 is threadingly engaged with the inlet pipe 158, which is optionally provided with a chamfered section 182 with about a 15 degree taper. The opposite outlet side of the pipe 180 is similarly chamfered at 184 about 15 degrees to induce an expanding conically shaped flow pattern into the diffuser section 186 of the outlet pipe 154. A plurality of holes 188 are drilled through the pipe 180 at about 45 degrees to the axis of the pipe 180. The holes are preferably ¹⁄₁₆ of an inch in diameter, and set 180 degrees apart from each other. Air and/or water from the injectors 156 and 172 passes through the holes 188 to mix with the fuel flowing through the pipe 180 to further homogenize the mixture ultimately provided to the engine. The pipe 180 is preferably bronze, machined to the optimal dimensions for the particular application.

Figure 8:
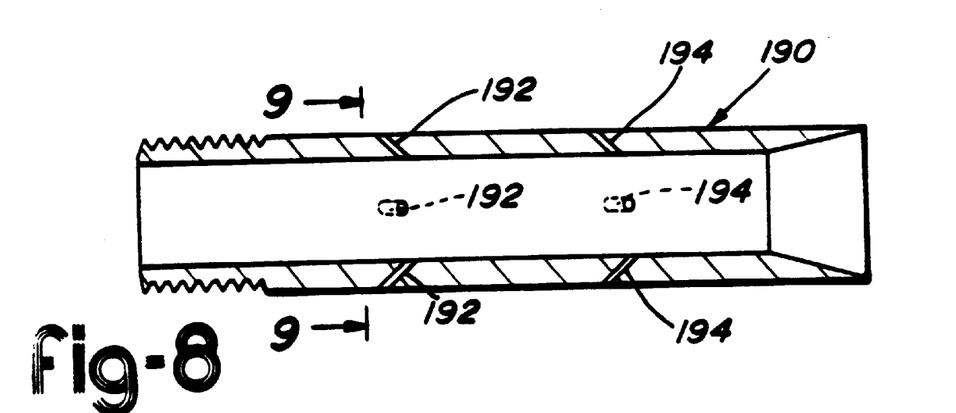
FIG. 8 is a cross-sectional view of another alternative embodiment of the pipe shown in FIG. 7.
Figure 9:
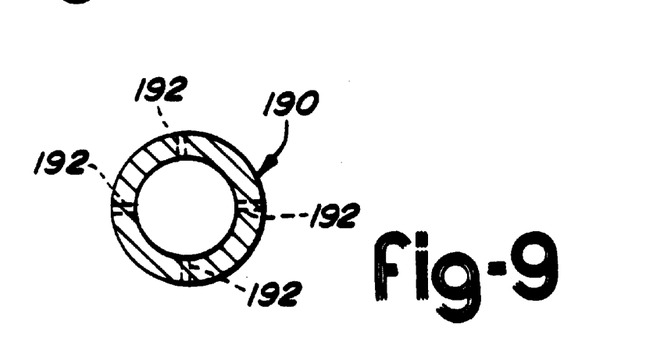
FIG. 9 is a cross-sectional view of the pipe taken along line 9—9 in FIG. 8.

FIGS. 8 and 9 show another alternative embodiment 190 of the pipe which extends at least partially through the housing 154. The pipe 190 is similar to the pipe 180 described with respect to FIG. 7, but is provided with two sets of entrainment holes 192 and 194. There are preferably four holes set 90 degrees apart from one another in each set of holes, and are again drilled at a 45 degree angle to the direction of the fuel flow. To increase the quantity of air and/or water passing through the holes 192 and 194, the diameter of each may be increased to ⅛ of an inch or so. Alternatively, 8 holes or more can be provided to constitute each set of holes, and of course the holes can be oriented at 30 degrees or any other efficient angle to the fuel flow.

The present invention also includes a method of forming a mixture of air and fuel to be supplied to an engine. The method comprises conducting a flow of the fuel into a first housing to create a region of relatively low pressure, and introducing air into the first housing to form the mixture. The mixture is then transmitted from the first housing to the engine at a rate which increases with the load on the engine. After the first housing reaches a predetermined, preferably maximum rate, a flow of fuel is conducted into a second housing to create a region of relatively low pressure. Air is introduced into the second housing to form the mixture, and the mixture is transmitted from the second housing to the engine at a rate which increases with the load on the engine. The method may further comprise conducting a flow of the fuel into a plurality of additional housings to create a region of relatively low pressure in each of the additional housings, and introducing air into the additional housings to form the mixture. With each of the additional housings, the mixture is serially transmitted from each additional housing to the engine when the housings already transmitting the mixture reach a predetermined rate. As described above, the method may further comprise introducing water into any or all of the housings before transmitting the mixture to the engine.

Figure 10:
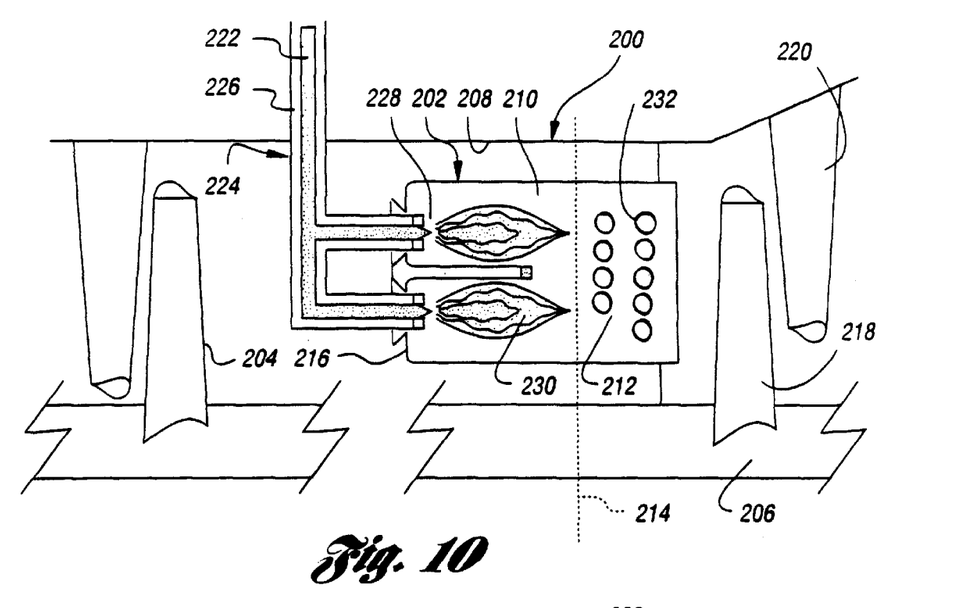
FIG. 10 is a partial schematic view of a gas turbine including a combustion can.

FIG. 10 shows a combustor 200 including a representative combustion can 202 for use when the present invention is applied to a gas turbine. A compressor having blades 204 communicates a flow of compressed air through the annular space between a rotor 206 and an outer wall 208 of the combustor. Combustion takes place in one or more of the combustion cans 202 located in this space.

The combustion can 202 is generally cylindrical, and has a primary combustion zone 210 and a secondary combustion zone 212 generally delineated by the dashed line 214. The combustion can 202 has a closed end 216 and an opposite end open to the remainder of the combustor, rotating blades 218 and stationary blades 220. Either fuel or a mixture of air and fuel is fed to the primary combustion zone 210 through means such as a single line or the inside line 222 of dual fuel manifold 224. For example, diesel oil or another liquid fuel may be supplied by a first mixing can or series of mixing cans such as the mixing can 10 shown in FIGS. 1 through 4. Alternatively, natural gas or another gaseous fuel may be supplied by a mixing can or series of mixing cans such as the mixing can 106 shown in FIGS. 5 through 7. When the gas turbine is run on gaseous fuel, it is preferred that an overly rich mixture of the gaseous fuel and air be supplied through line 222, with the mixture containing a percentage of fuel above an upper flammability limit of the fuel.

A second mixing can or series of mixing cans supplies to the primary combustion zone 210, either through the outside line 226 of the dual fuel manifold 224 or through a single line which also carries the fuel, an amount of air sufficient to achieve a mixture containing a percentage of fuel within the flammability limit of the fuel. For example, if diesel oil (either with or without water mixed therewith) is being supplied from the mixing can 10 through the inner line 222, the flow of natural gas to mixing can 106 is shut off. However, the mixing can 106 continues to supply compressed air through the line 226, preferably enough to attain a relatively lean mixture at burner tips 228. If operation of the gas turbine is switched so that natural gas premixed with air is being supplied from the mixing can 106 through inner line 222, the flow of liquid fuel to mixing can 10 is stopped. The remaining combustion air necessary to achieve a flammable mixture is supplied to line 226 from the mixing can 10 through air inlets and regulators provided in the can 10 for this purpose, or through modified nozzles 16, 18, 20, 22, 24 and 26.

The combustible mixture which forms at the burner tips 228 feeds flame 230, which resides almost entirely in the primary combustion zone 210. The amount of combustion air provided through the outside line 226 can be closely controlled, allowing the flame 230 to be easily trimmed. While the combustion can 202 may be provided with a minimum number of holes to provide cooling of the combustion can, no substantial amount of excess compressor air enters the primary combustion zone 210. To minimize the intrusion of compressor air into the primary combustion zone, an inner liner having no holes may be provided. Because essentially no compressor air circulates into the primary combustion zone, the flame 230 is not disrupted.

The majority of the air flow from the compressor blades 204 is forced around the combustion can 202, as indicated by the arrows in FIG. 10. The section of the combustion can 202 which surrounds the secondary combustion zone 212 has a plurality of holes 232 through which the secondary combustion zone may communicate with the exterior of the combustion can. The number, size and location of the holes 232 are chosen to permit a limited amount of compressor air to enter the secondary combustion zone 212 to cool or quench the combustion gases produced in the primary combustion zone 210. Like some aircraft gas turbine combustion cans, the combustion can 202 has fewer holes than conventional industrial gas turbine combustion cans, but unlike aircraft combustion cans the combustion can 202 has few if any holes in the primary combustion zone.

The excess compressor air which passes around the combustion can 202 also improves the efficiency of the gas turbine as compared to conventional constructions because the cooler, denser compressor air provides more energy to the turbine blades 218 and 220. Furthermore, the heat rate of the gas turbine is improved because the flame 230 is not disrupted by the air flow from the compressor, and thus a constant combustion temperature can be maintained at a lower fuel flow rate. It has also been found that the visible plume produced by the present invention is less than the plume produced by conventional gas turbines.

Figure 11:
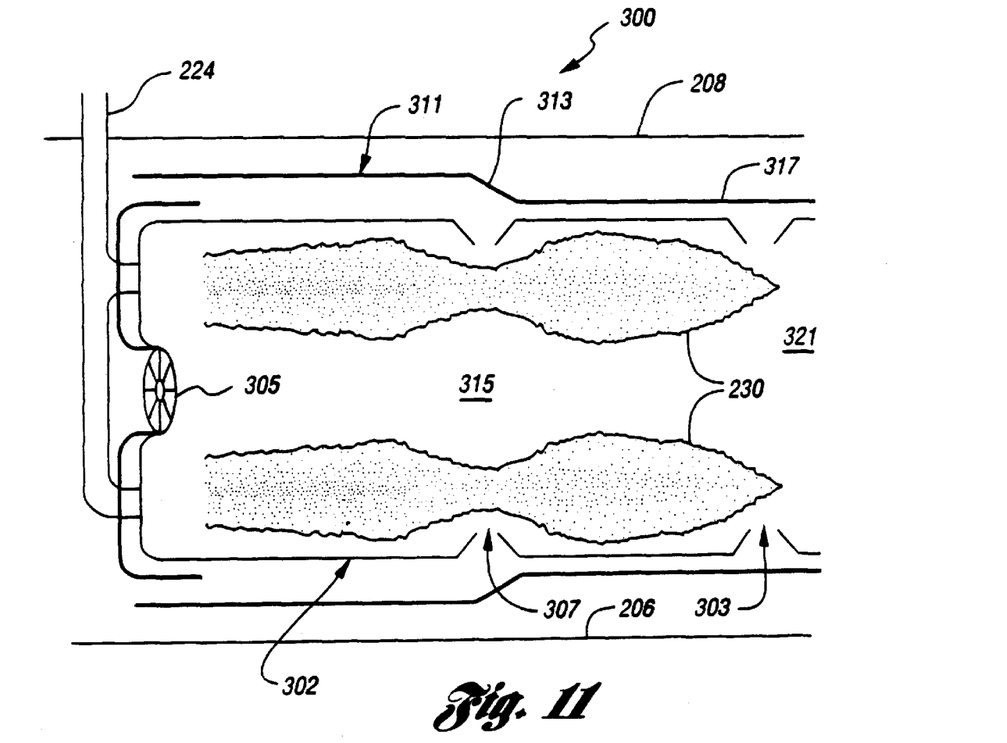
FIG. 11 is a view similar to FIG. 10 of an alternative embodiment of the gas turbine.

FIG. 11 shows an alternative embodiment 300 of the combustor including a representative combustion can 302 in which the primary combustion zone is convection cooled, and no holes are provided in the secondary combustion zone. A primary zone air swirler 305, in the form of a generally circular inlet having stationary blades, is also provided through which compressor air can be introduced into the primary combustion zone. Two sets of inlets 307 and 309 are annularly spaced around the combustion can 302. A series of scoops 311 are connected together and disposed around the combustion can in the annular space between the rotor 206 and the outer wall 208 of the combustor. Each scoop 311 includes an inclined portion 313 which directs at least a portion of the air flowing around the can 302 through the inlets 307 and into a quench zone 315. In general, the quench zone 315 divides the flame 230 into an upstream fuel rich zone and a downstream fuel lean zone.

Figure 12:
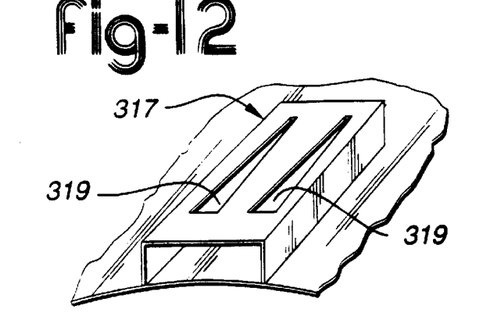
FIG. 12 is a perspective view of a weir for the combustion can.
Figure 13:
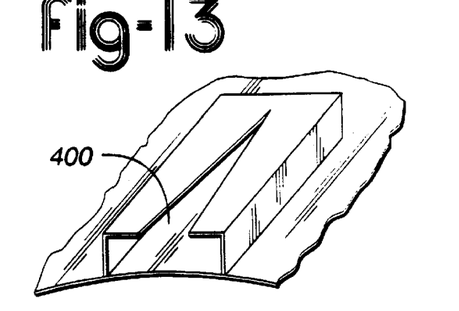
FIG. 13 is a perspective view of an alternative embodiment of the weir.

As shown in FIG. 12, each scoop 311 has a downstream, radially narrower weir 317 having a pair of trapezoidal cutouts 319. The weir 317 allows a portion of the compressor air flowing around the scoop 311 to pass through the cutouts 319 and, with a portion of the compressor air flowing between the combustion can 302 and the scoop, to pass through the inlets 309 and into a dilution zone 321. Preferably, twelve scoops made of Hastelloy-X are welded together around the can 302.

Figure 14:
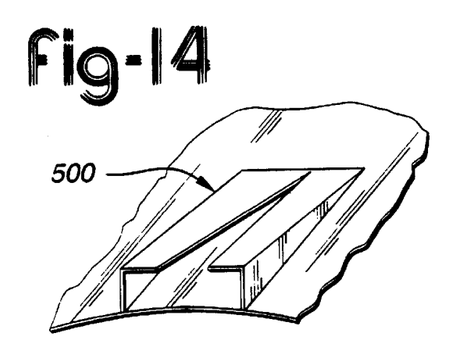
FIG. 14 is a perspective view of another alternative embodiment of the weir.
Figure 15:
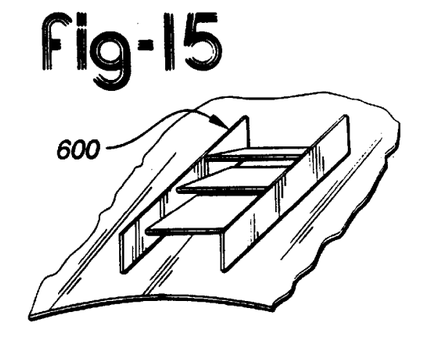
FIG. 15 is a perspective view of another alternative embodiment of the weir.
Figure 16:
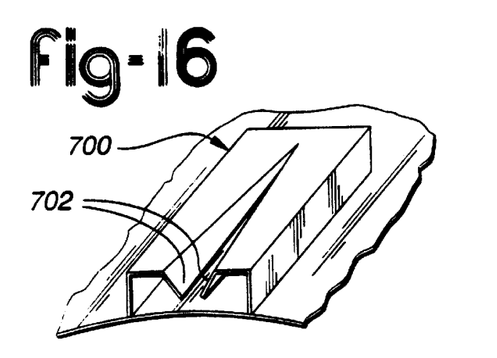
FIG. 16 is a perspective view of another alternative embodiment of the weir.
Figure 17:
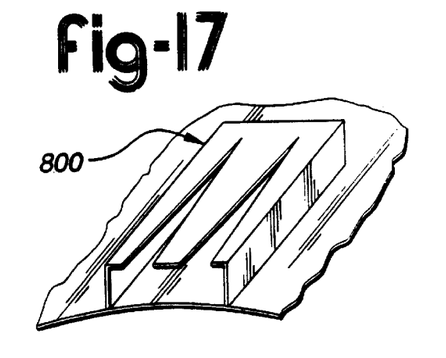
FIG. 17 is a perspective view of another alternative embodiment of the weir.
Figure 18:
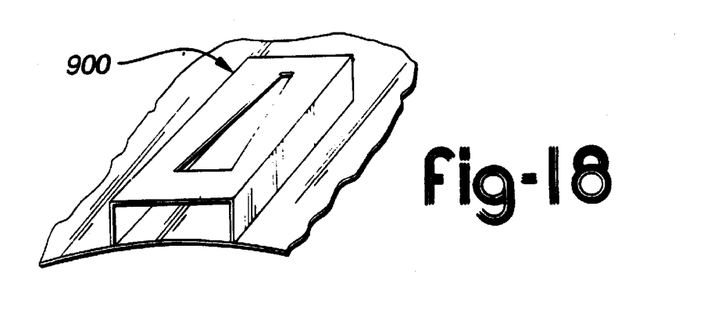
FIG. 18 is a perspective view of another alternative embodiment of the weir.

FIGS. 13 through 18 show alternative embodiments of the weir. The embodiment shown in FIG. 13, for instance, has a single open ended, triangular shaped cutout 400. FIG. 14 shows a similar weir 500 having a downstream end which tapers radially inwardly toward the combustion can. The weir 600 shown in FIG. 15 has a series of baffles arranged at increasing angles to the airflow. FIG. 16 shows a weir 700 similar to that shown in FIG. 13, with inward edges of the cutout having sloped and radially directed members 702. FIG. 17 shows a weir 800, similar to that shown in FIG. 13, with a pair of triangular cutouts. FIG. 18 shows a weir 900 having a single trapezoidal cutout.

Although the various embodiments of the present invention have been described in relation to a gas turbine, it should be understood that they are applicable to any type of internal combustion engine, including boilers, and gasoline or diesel engines.

It should also be understood that while the forms of the invention herein shown and described constitute preferred embodiments of the invention, they are not intended to illustrate all possible forms thereof. The words used are words of description rather than limitation, and various changes may be made without departing from the spirit and scope of the invention disclosed.

What is claimed is:

1. A method of forming a mixture of water and fuel to be supplied to an engine, the method comprising:
   introducing the fuel into a housing;
   spraying water through a first injector into the housing at a rate which increases with the load on the engine, such that the water and fuel form a mixture; and
   spraying water through a second injector into the housing after the first injector reaches a predetermined rate; and
   delivering the mixture to the engine.

2. The method of claim 1 further comprising passing the mixture through a static mixer before delivering the mixture to the engine.

3. The method of claim 1 wherein the predetermined rate is the maximum rate of the first injector.

* * * * *